United States Patent
Brown et al.

[11] 3,708,983
[45] Jan. 9, 1973

[54] APPARATUS FOR CONFINING OIL SPILLS

[76] Inventors: William E. Brown, 132 Milliken Drive, Napa, Calif. 94558; Edmond E. Gilbert, 4990 Alhambra Avenue, Martinez, Calif. 94553

[22] Filed: Feb. 16, 1971

[21] Appl. No.: 115,603

[52] U.S. Cl. ................................................. 61/1 F
[51] Int. Cl. .............................................. E02b 15/04
[58] Field of Search ........ 61/1 F, 5; 210/DIG. 4, 242; 114/.5 D, .5 T

[56] References Cited

UNITED STATES PATENTS

| | | | |
|---|---|---|---|
| 3,476,246 | 11/1969 | Dahan | 61/1 F |
| 3,592,005 | 7/1971 | Greenwood | 61/1 F |
| 3,435,793 | 4/1969 | Shurtleff | 114/.5 T |
| 3,537,412 | 11/1970 | Henderson | 114/.5 T |

FOREIGN PATENTS OR APPLICATIONS 1,294,889  5/1969  Germany ........................ 61/1 F Primary Examiner—Peter M. Caun
Attorney—Owen, Wickersham & Erickson

[57] ABSTRACT

Apparatus comprising a series of air-retaining structural units connected together in a complete loop so that it will float while surrounding a vessel that may be leaking or spilling oil or some other lighter-than-water fluid. All units are hollow and provided with means for releasing the air so that they will submerge to any desired depth and means for resupplying air so that they can be again raised when needed.

8 Claims, 11 Drawing Figures

PATENTED JAN 9 1973 3,708,983
SHEET 1 OF 2
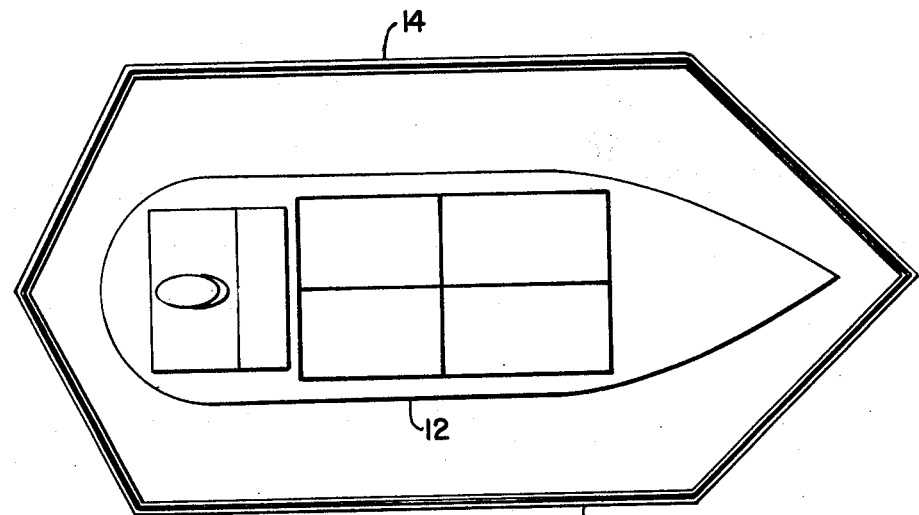
FIG_1
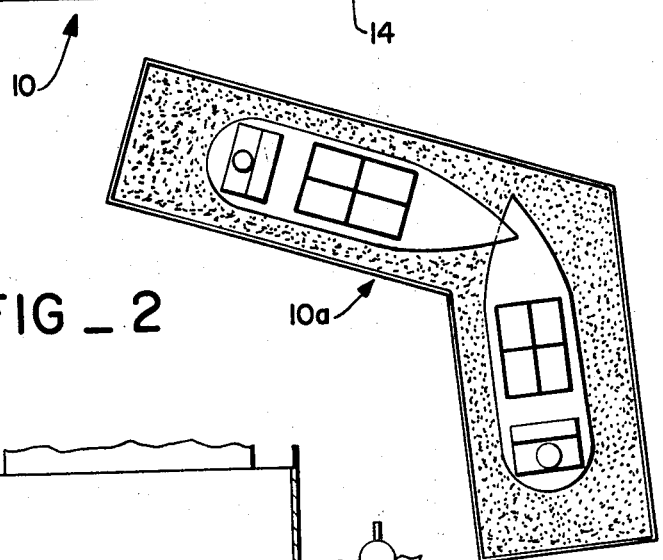
FIG_2
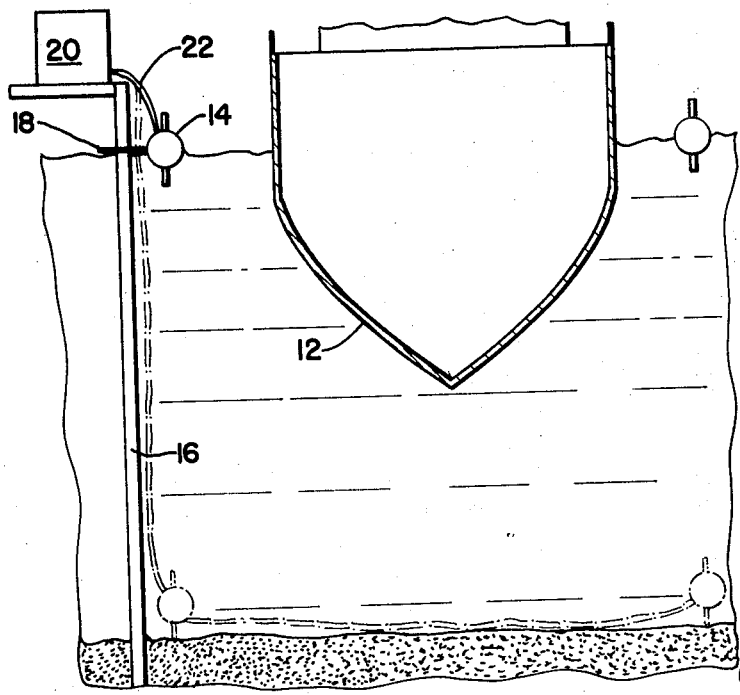
FIG_3
INVENTORS
WILLIAM E. BROWN
BY EDMOND E. GILBERT
Owen, Wickersham & Erickson
ATTORNEYS

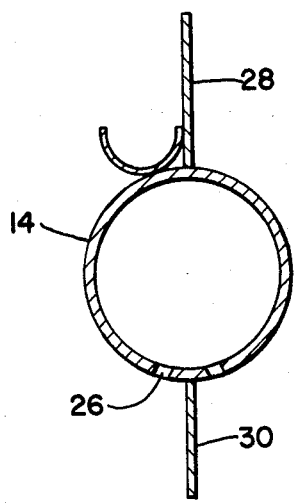
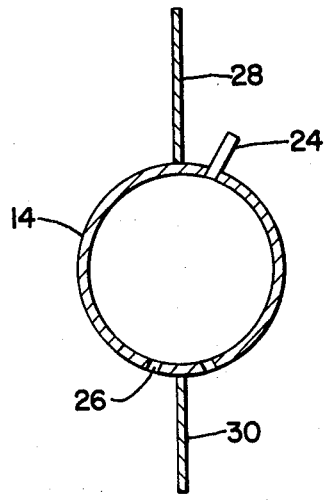
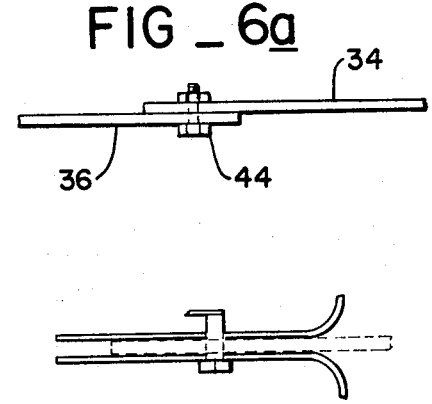
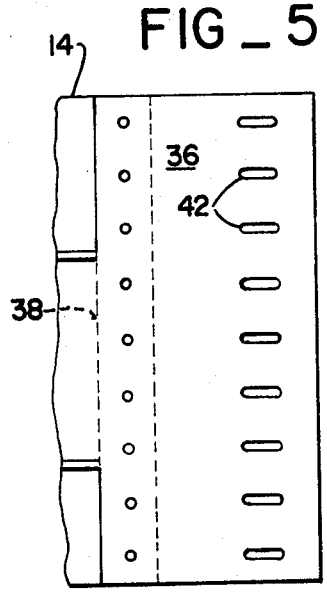
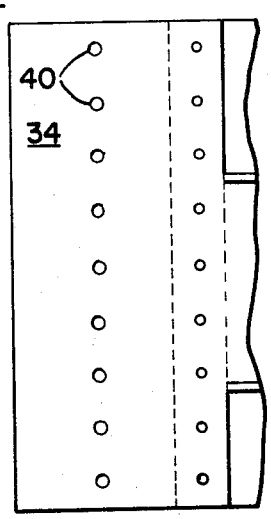
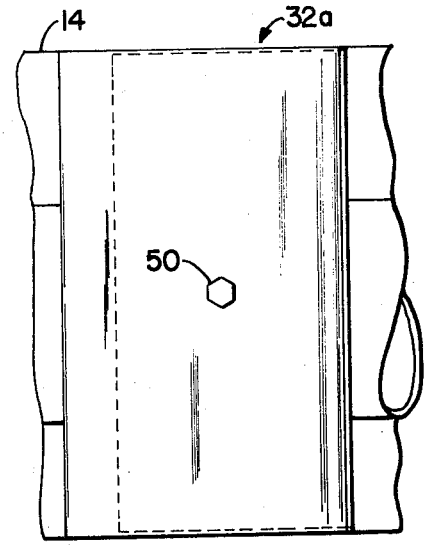
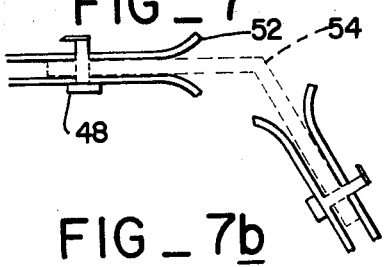
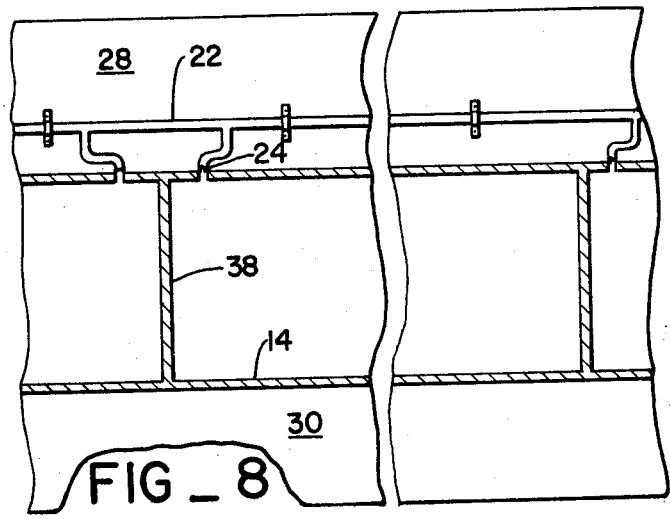

APPARATUS FOR CONFINING OIL SPILLS

This invention relates to an apparatus for confining materials of less density than water that have been inadvertently released in or deposited on the water, and in particular it relates to a floatable structure for confining and preventing the spread of petroleum products over a water surface.

The devastating ecological effects of oil spillage on water ways of all types are well known. Not only is bird, plant and animal life often severely damaged or destroyed by such accidents but the spreading oil can severely contaminate marine or shore property for long periods. Since oil is essential to a modern industrial economy and must be transported by tankers, barges and the like, marine accidents inevitably occur to cause spillages and these accidents usually take place where even a small deposit of oil in water can spread and cause great damage. Also, in loading and unloading oil tankers or barges spillages often occur. Accordingly, a severe problem arose of providing an effective, practical apparatus for confining such oil spills or deposits on water so that the oil cannot spread and can be removed from the water.

It is therefore one object of the present invention to provide a solution to this problem.

Another object of the present invention is to provide an apparatus that can be formed as a closed loop for surrounding a vessel of any size and if desired a loop of any irregular shape for surrounding two vessels.

Another object of the present invention is to provide an apparatus that can be easily pushed or towed through the water from one location to another.

Another object of the present invention is to provide an apparatus that can be submerged to move it beneath an area and then raised to encompass a patch of oil on the water's surface within the area.

Another object of the present invention is to provide an apparatus that can be regulated to control its buoyancy so that it will remain at a particular depth.

Another object of the present invention is to provide an apparatus that will be effective to confine oil deposited on water ways even if it is subjected to rough waves or high swells.

Another object of our invention is to provide an apparatus that will not only confine the oil deposited on the water but also collect a substantial portion of it so that it can be removed.

Still another object is to provide an apparatus particularly adapted for confining oil that is spilled during the loading and unloading of tankers at dockside in a waterway, and moreover an apparatus that is easy to operate with a minimum of labor and which is relatively free of maintenance.

In broad terms, the foregoing objects are accomplished by an apparatus comprised of a series of elongated, hollow, structural units that are connected together to form a closed loop of any desired configuration. Each structural unit is air-tight except for inlet and outlet openings and each is connected to an air line that may be attached to a compressor. Valves on each unit may be actuated simultaneously to allow air to escape from and water to enter to units, thereby causing them to flood and submerge the apparatus. With a ship or oil slick to be contained located above the apparatus, the outlet valves can be closed and the inlet valves opened so that the compressor can supply air to raise the apparatus to the water surface. Barrier portions extending above and below the hollow air-filled units prevent waves from breaking over the apparatus and oil from passing under it. Thus, the confined oil is prevented from spreading and can be removed from the water's surface by any suitable skimming or oil removal device.

Other objects, advantages and features of our invention will become apparent from the following detailed description taken in conjunction with the drawings, in which:

FIG. 1 is a plan view showing one embodiment of an apparatus embodying the principles of the present invention as it appears in position around a vessel;

FIG. 2 is a plan view showing an irregular shaped version of our apparatus;

FIG. 3 is a view in elevation and in section showing the apparatus of FIG. 1, with dotted lines showing it in the submerged position;

FIG. 4 is an enlarged view in section of one unit of our apparatus;

FIG. 5 is an enlarged view in section of another unit of our apparatus having a side trap;

FIG. 6 is an enlarged fragmentary view showing the end portions of two units that are connected to form an apparatus according to the invention;

FIG. 6a is a view in section showing the end portions of FIG. 6 connected together;

FIG. 7 is a fragmentary view in elevation of another joint for units comprising our oil confining apparatus;

FIG. 7a is a view in section taken along line 7a–7a of FIG. 7; and

FIG. 8 is an enlarged fragmentary view showing a portion of our apparatus with its attached air line.

With reference to the drawing, FIG. 1 shows an apparatus 10 as it appears in use surrounding a vessel 12 that may be leaking or spilling oil. Generally, the apparatus comprises a series of hollow units 14 that are connected together by either rigid or flexible joints to form a complete loop or enclosure. Depending on the lengths of the units and the form of joints used the apparatus can have any desired configuration and can be of any size. For example, as shown in FIG. 2, an apparatus 10a of an irregular shape can be provided to form an oil confining barrier around two ships that have inadvertently collided and may be spilling oil.

An important feature of our apparatus is that it can be controlled so as to be submersed or raised to the water surface when necessary. In the embodiment of the invention shown in FIG. 3, the apparatus 10 is installed adjacent the pilings 16 of an oil loading dock facility. Preferably, one side of the apparatus is loosely attached to the dock pilings by some guide means such as ring members 18 fixed to one side of the apparatus. Thus, with the apparatus submerged (as shown in the dotted lines of FIG. 3), the vessel to be loaded or unloaded can be maneuvered next to the dock directly above our confining apparatus 10. A compressor 20 located conveniently on the dock facility supplies air through a line 22 to the connected units 14 of the apparatus and forces water out of them. The apparatus thus becomes buoyant and rises toward the surface while being guided by the ring members around the adjacent pilings. When the apparatus reaches the surface it forms a barrier completely around the vessel and if oil is spilled when loading commences it is confined within the area inside the apparatus.

As shown in FIG. 4, the hollow barrier units 14 may have a pipe-like cylindrical configuration and are preferably made of metal. However, they need not be cylindrical or metal, but could have some other elongated shape and be constructed of some other material such as reinforced plastic. On each unit is an equalizing inlet air valve 24 of any suitable type. These valves on all the units of our apparatus are connected in parallel to the air line 22 which is attached to and extends along the unit. These valves are of the equalizing type which operate so that equal pressure is maintained in each unit, thereby providing each unit with the same buoyancy at all times. The valves 24 may be remotely controlled so that they can be opened simultaneously to allow air to escape from the units and thereby cause them to submerge at the desired rate. On the bottom side of each unit are a pair of openings 26 that allow water to enter when air escapes from the unit's valve 24.

Extending generally vertically above the hollow portion of each floatable unit and axially along it is a fin-like barrier member 28 that may be welded or otherwise attached to the hollow portion. This member extends well above the water level when the unit is filled with air and serves to hold in the oil or other foreign matter floating on the water on one side while preventing waves from splashing over from the outside.

Extending vertically below each unit 14 is a similar fin-like member 30 which is also firmly attached and extends axially along it. Both of these members 28 and 30 should be made of a rigid material such as sheet metal and are secured by suitable bracing (not shown) so that they will not fail when subjected to side loading by wind or waves. The lower member 30 extends downwardly a sufficient amount to prevent any oil or other confined material from passing under the apparatus when it is in its normal buoyant position. This lower member also serves as a stabilizing factor in that it tends to dampen any tendency for the units to roll or twist in rough water.

The length of the floatable units 14 may vary depending on the size of the apparatus desired and other factors. In some instances, it may be desirable to provide relatively long units with bulkheads forming separate watertight compartments, each provided with a valve 24 and a lower water opening 26. In such instances, the units are essentially welded together as a unitary compartmented structure. In other situations, particularly where an expandable apparatus is desired, it may be preferable to form our apparatus by connecting together the units 14 by a suitable joint. In FIGS. 6 and 6a, a joint 32 is provided by a pair of vertical plate members 34 and 36 which overlap. Each plate member is attached to the upper and lower fin-like barrier portions 28 and 30 and extends diagonally across an end cap 38 thereon. One plate 34 may be provided with round holes 40 spaced vertically apart and the other plate 36 may have similarly spaced apart slots 42 which can be aligned with the holes so that bolts 44 can easily be inserted through matched pairs of holes and slots when the plates 34 and 36 overlap. This connection can be easily made even with the apparatus in the water. Moreover, it is strong and also essentially leak-proof. These plate members may be rigid but preferably they are made from a pliable, flexible material that will withstand exposure to oil such as a plastic and fabric composition.

Another joint 32a, as shown in FIGS. 7 and 7a, comprises a vertical bifurcated plate member 44 with outwardly flared edges on one floatable unit 14 that will receive a single plate element 46 on the adjacent unit. When the latter plate is within the bifurcated member a bolt or pin 48 is inserted through aligned holes 50 to hold the units together.

In instances where our apparatus requires an angular corner connection between floatable units a joint 32a may be formed by providing each unit with a bifurcated member 52 as shown in FIG. 7b. Retained within these two plate members by separate pins 48 is a bendable plate member 54 which provides a hinge-like connection.

Although the foregoing describes highly effective and suitable joints, it is apparent that other forms of joint structures for connecting the floatable units 14 could be used within the scope of our invention.

In operation, the apparatus 10 may be used in a variety of ways to confine oil or other products less dense than water that are spilled on its surface. For example, our apparatus may be pre-assembled and towed to the site of an oil slick. Upon reaching the site, it can be submersed and moved beneath the slick and then raised to its buoyant position surrounding it. In other situations, the apparatus may be assembled from a plurality of floatable units on the water by means of the quick connecting joints 32, 32a and 32b. Further, our apparatus provides great utility in the relatively permanent type of installation illustrated in FIG. 3, where it can be conveniently raised and lowered to accommodate each tanker ship that is loaded or unloaded. Use of our apparatus in the aforesaid ways solves the problem of confining oil slicks on water, thereby preventing it from spreading and causing damage. Moreover, it enables oil to be confined so that it can be easily captured and removed from the water before it can escape. The continuous use of our apparatus at oil loading docks can essentially eliminate water pollution by oil at such locations.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. An apparatus for preventing the spread of petroleum products on a water surface comprising:
   a series of elongated, hollow structural unit connected together to form an enclosure;
   a first inlet opening on each said unit, a valve means for each said opening, and an air line extending from said valve means and adapted for connection to a pressurized air source;
   a second inlet opening on a lower side of each said unit for allowing water to enter when air pressure within the unit is decreased;

and means for controlling said valves simultaneously so that said apparatus can be submerged and then raised by the air pressure displacing the water, to a position surrounding an area on the water's surface.

2. The apparatus as described in claim 1 including fin-like barrier members extending upwardly and downwardly from and axially along said structural units.

3. The apparatus as described in claim 1 wherein said structural units are cylindrical in shape and fabricated from metal.

4. The apparatus as described in claim 2 including joint means at the ends of said structural units for connecting them together in forming said enclosure, said joint means including overlapping flange members fixed to said barrier members.

5. The apparatus as described in claim 4 wherein at least one said flange member for each said joint means comprising a flexible plate member made at least partially of plastic material.

6. A protective, submersible enclosure for confining and preventing the spread of petroleum products released from a ship into the water around it, said apparatus comprising:

an elongated closed loop enclosure including connected hollow structural units each said unit having axial barrier means extending above and below along its full length;

passage means in said units for allowing water to flow into said structural units when at least a portion of each unit is immersed in the water while air is simultaneously released in order to submerge the enclosure;

and means for forcing air into said hollow units for displacing the water and retaining air pressure therein sufficient to make said units buoyant and thereby cause said enclosure to rise to the surface around an oil slock or around a ship being loaded.

7. An apparatus according to claim 1 including means for attaching a plurality of said structural units to uprights adjacent a boat dock for guiding the vertical movements of the enclosure between submersion in the water and the surface thereof.

8. An apparatus according to claim 6 including means for attaching a plurality of said structural units to uprights adjacent a boat dock for guiding the vertical movements of the enclosure between submersion in the water and the surface thereof.

* * * * *